US011353315B2

(12) United States Patent
Yokoyama (10) Patent No.: US 11,353,315 B2
(45) Date of Patent: Jun. 7, 2022

(54) LASER INTERFERENCE DEVICE

(71) Applicant: MITUTOYO CORPORATION, Kanagawa (JP)

(72) Inventor: Yuichiro Yokoyama, Chiba (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 17/197,349

(22) Filed: Mar. 10, 2021

(65) Prior Publication Data
US 2021/0293523 A1    Sep. 23, 2021

(30) Foreign Application Priority Data

Mar. 19, 2020    (JP) .............................. JP2020-049329

(51) Int. Cl.
*G01B 9/02003* (2022.01)
*G01B 9/02015* (2022.01)
*G02B 27/10* (2006.01)

(52) U.S. Cl.
CPC ..... *G01B 9/02003* (2013.01); *G01B 9/02027* (2013.01); *G02B 27/1006* (2013.01); *G01B 2290/45* (2013.01); *G01B 2290/60* (2013.01); *G01B 2290/70* (2013.01)

(58) Field of Classification Search
CPC .............. G01J 9/0246; G01B 9/02003; G01B 9/02027; G01B 2290/45; G01B 2290/60
See application file for complete search history.

(56) References Cited

U.S. PATENT DOCUMENTS

| 5,818,588 A * | 10/1998 | Matsumoto | G01B 9/02007 356/487 |
| 2005/0008322 A1* | 1/2005 | Sullivan | G01B 9/02003 385/147 |
| 2010/0026983 A1* | 2/2010 | Kawasaki | G01B 9/02005 356/4.1 |
| 2010/0085574 A1* | 4/2010 | Takahashi | G01S 7/497 356/497 |
| 2019/0049312 A1* | 2/2019 | Strandjord | G01B 11/14 |

FOREIGN PATENT DOCUMENTS

| JP | 11125504 A * | 5/1999 |
| JP | 3400393 | 4/2003 |

* cited by examiner

*Primary Examiner* — Michael A Lyons
(74) *Attorney, Agent, or Firm* — Greenblum & Bernstein, P.L.C.

(57) ABSTRACT

A laser interference device includes a measurement laser that outputs a laser beam, a beam splitter that divides the laser beam into a measurement laser beam and a frequency monitor laser beam, a reference laser that outputs a reference laser beam, a frequency detector that detects a beat frequency resulting from interference between the reference laser beam and the frequency monitor laser beam, a wavelength calculator that calculates a wavelength of the frequency monitor laser beam (a wavelength measurement value) on the basis of the beat frequency, a light detector that detects an interference light of the measurement light and the reference light of the measurement laser beam and outputs a light detection signal, and a displacement calculator that calculates a displacement of the measurement mirror by performing an arithmetic process based on the wavelength measurement value and the light detection signal.

4 Claims, 4 Drawing Sheets

LASER INTERFERENCE DEVICE

The entire disclosure of Japanese Patent Application No. 2020-049329 filed Mar. 19, 2020 is expressly incorporated by reference herein.

TECHNICAL FIELD

The present invention relates to a laser interference device.

BACKGROUND ART

In a measuring instrument, an ultraprecision machining device, or the like, a Michelson laser interference device has been used as means for measuring a displacement of a movable body with a high accuracy (for instance, see Patent Literature 1: JP 3400393 B).

In such a laser interference device, a laser beam outputted from a laser is divided into a measurement light and a reference light by a beam splitter. The measurement light is reflected by a movable mirror attached to the movable body, while the reference light is reflected by a reference mirror disposed at a predetermined position. The reflected lights are superimposed on each other, generating an interference light. Assuming that $\lambda$ denotes a wavelength of the laser beam, interference fringes with a light-and-dark pattern of the interference light inverted are detected with each $\lambda/2$ change in an optical path length difference between an optical path length of the measurement light and an optical path length of the reference light. Accordingly, a displacement of the movable mirror can be measured by performing an arithmetic process by using a wavelength $\lambda$.

Meanwhile, a typical laser interference device includes a laser such as a practical wavelength stabilized helium neon laser. Since an oscillation wavelength of such a laser changes with time, a measurement accuracy of the typical laser interference device can be maintained by periodically calibrating the wavelength $\lambda$.

However, a typical calibration work, which includes a work of removing the laser from the laser interference device and setting the laser in a wavelength measurement device and a work of restoring the removed laser in the laser interference device, is a complicated work accompanied with optical adjustment.

SUMMARY OF THE INVENTION

An object of the invention is to provide a laser interference device not requiring a complicated calibration work.

A laser interference device according to an aspect of the invention includes a measurement laser configured to output a laser beam; a first beam splitter configured to divide the laser beam into a measurement laser beam and a frequency monitor laser beam; a reference laser configured to output a reference laser beam; a frequency detector configured to detect a beat frequency resulting from interference between the reference laser beam and the frequency monitor laser beam; a wavelength calculator configured to calculate a wavelength of the frequency monitor laser beam on the basis of the beat frequency inputted from the frequency detector; a second beam splitter configured to divide the measurement laser beam into a measurement light and a reference light; a light detector configured to detect an interference light of the measurement light reflected on a measurement mirror and the reference light reflected on a reference mirror and output a light detection signal; and a displacement calculator configured to calculate a displacement of the measurement mirror by performing an arithmetic process based on a wavelength measurement value and the light detection signal, the wavelength measurement value indicating the wavelength calculated by the wavelength calculator.

In the aspect of the invention, the laser beam outputted from the measurement laser is divided into the frequency monitor laser beam and the measurement laser beam and the wavelength (a wavelength measurement value) of the frequency monitor laser beam is used as a calibration value of the wavelength of the measurement laser beam. This makes the measurement of the displacement of the measurement mirror by using the measurement laser beam free from an influence of a measurement error resulting from a change in the laser beam with time. Therefore, according to the aspect of the invention, the laser interference device not requiring a typical complicated calibration work is provided.

In the laser interference device of the above aspect of the invention, it is preferable that the wavelength calculator be configured to periodically calculate the wavelength measurement value by periodically acquiring the beat frequency.

In the aspect of the invention, the wavelength measurement value used for the arithmetic process of the displacement calculator can be periodically updated and, consequently, the displacement of the movable mirror can be measured with a higher accuracy. In addition, the wavelength measurement value is stored in an accumulative manner, which allows for monitoring a change in the wavelength of the laser beam with time.

It is preferable that the laser interference device of the above aspect of the invention further include an effectiveness determiner configured to determine whether or not an absolute value of a difference between the wavelength measurement value and a reference value of the wavelength of the frequency monitor laser beam stored in a storage is equal to or less than a first threshold set in advance.

In the aspect of the invention, the effectiveness determiner can determine whether or not the wavelength measurement value is effective by determining whether or not the absolute value of the difference between the wavelength measurement value and the reference value is equal to or less than the first threshold. It should be noted that the first threshold can be set with reference to, for instance, an amount of a change in a wavelength of the measurement laser with time.

In the laser interference device of the above aspect of the invention, it is preferable that the wavelength calculator be configured to acquire the beat frequency from the frequency detector in response to input of measurement start instructions regarding the displacement of the measurement mirror.

In the aspect of the invention, the wavelength of the frequency monitor laser beam is measured immediately before a timing when the displacement of the measurement mirror is measured. The displacement calculator can perform the arithmetic process by using the wavelength measurement value closer to a current wavelength of the frequency monitor laser beam and, consequently, the displacement of the movable mirror can be measured with a higher accuracy.

In the laser interference device of the above aspect of the invention, it is preferable that the wavelength calculator be configured to further acquire the beat frequency from the frequency detector in response to termination of the arithmetic process performed by the displacement calculator and the laser interference device further include a stability determiner configured to determine whether or not an absolute value of a difference between the wavelength measurement value calculated in response to the input of the measurement start instructions and the wavelength measurement value calculated in response to the termination of the arithmetic process is equal to or less than a second threshold set in advance.

In the aspect of the invention, the stability determiner can determine whether or not the wavelength of the frequency monitor laser beam was stable by determining whether or not an absolute value of a difference between two wavelength measurement values measured before and after the measurement of the displacement is equal to or less than the second threshold. This allows for confirming effectiveness regarding a measurement result of the displacement of the movable mirror. It should be noted that the second threshold, which is a value set on the basis of a guaranteed measurement accuracy of the laser interference device, can be set with reference to, for instance, a tolerable error of the wavelength of the measurement laser.

It is preferable that the laser interference device of the above aspect of the invention further include an optical fiber configured to transmit at least one of the measurement laser beam or the frequency monitor laser beam divided by the first beam splitter.

In the aspect of the invention, at least one of the measurement laser or the reference laser can be disposed at a distance from the light detector, allowing for reducing an influence of heat emitted from the lasers on an optical path length difference between the measurement light and the reference light. As a result, the displacement of the movable mirror can be measured with a higher accuracy.

DESCRIPTION OF EMBODIMENT(S)

Figure 1:
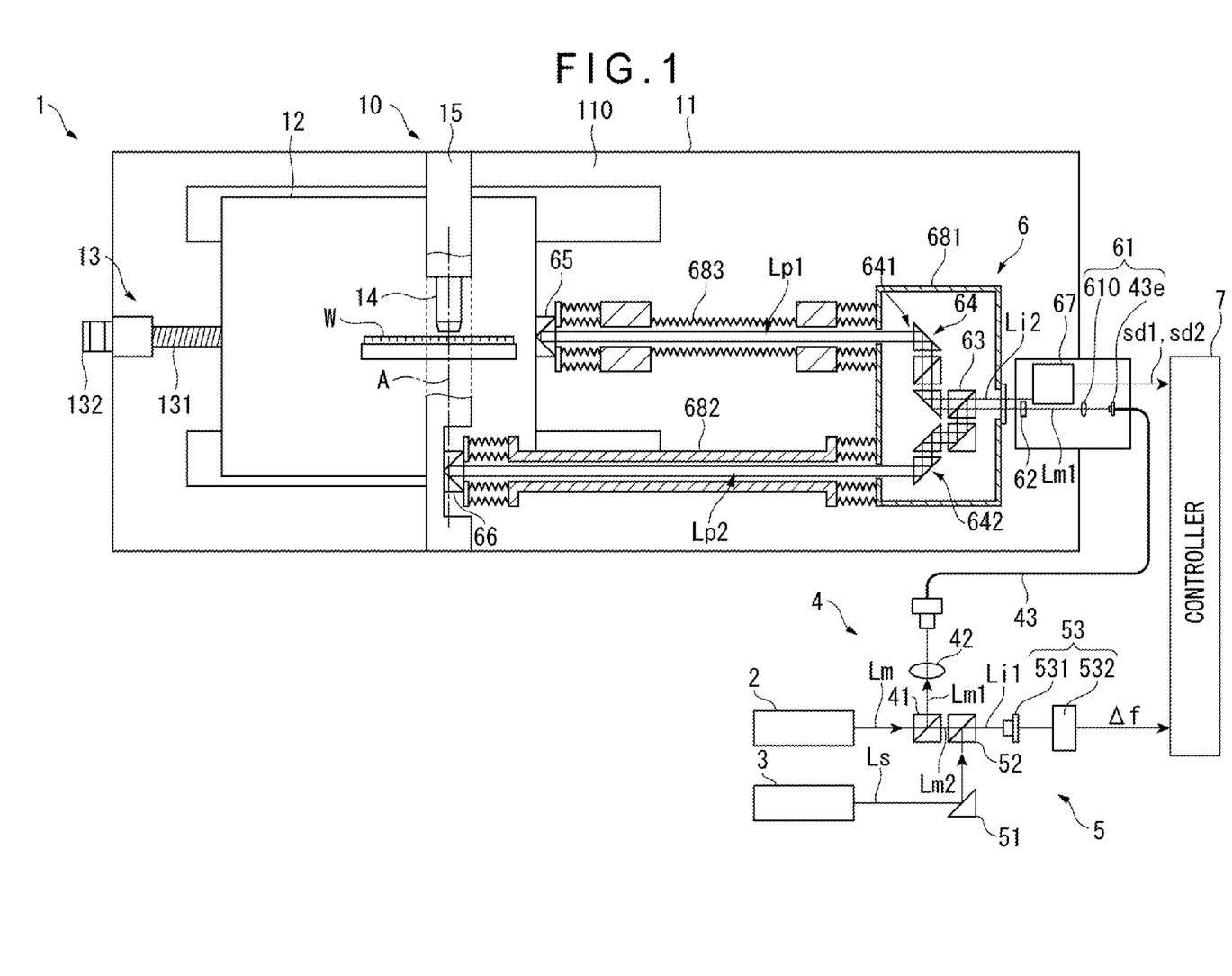
FIG. 1 is a schematic diagram showing a laser interference device according to an exemplary embodiment of the invention.

Description will be made on an exemplary embodiment of the invention with reference to the attached drawings.
Laser Interference Device As shown in FIG. 1, a laser interference device 1 of the exemplary embodiment is provided as a device configured to measure a unidirectional displacement of a slider 12 on which an object W is placed.

The laser interference device 1 includes: a measurement laser 2 configured to output a laser beam Lm; a reference laser 3 configured to output a reference laser beam Ls; a light guide 4 configured to divide the laser beam Lm into a measurement laser beam Lm1 and a frequency monitor laser beam Lm2 and guide the measurement laser beam Lm1 and the frequency monitor laser beam Lm2; a first interferometer 5 for measuring a wavelength of the frequency monitor laser beam Lm2; a device body 10 (including a second interferometer 6) for measuring a displacement of the slider 12; and a controller 7.

The measurement laser 2, which is, for instance, a practical wavelength stabilized laser such as a practical wavelength stabilized helium neon laser, is configured to output the laser beam Lm, which is to be used for displacement measurement.

The reference laser 3, which is, for instance, a laser that uses an absorption line of gas to control an oscillation frequency, such as an iodine stabilized helium neon laser, is configured to output the reference laser beam Ls, which is to be used for wavelength measurement. The reference laser 3, the oscillation frequency of which is controlled with reference to any absorption line of gas, can output the highly accurate and stable reference laser beam Ls.

The light guide 4 includes a beam splitter 41 configured to divide the laser beam Lm outputted from the measurement laser 2 into the measurement laser beam Lm1 and the frequency monitor laser beam Lm2.

The beam splitter 41, which corresponds to a first beam splitter of the invention, is configured to divide the laser beam Lm outputted from the measurement laser 2 into two at a predetermined ratio, reflecting one of the two lights as the measurement laser beam Lm1 while transmitting the other light through as the frequency monitor laser beam Lm2.

In addition, the light guide 4 includes: a condenser lens 42 configured to condense the measurement laser beam Lm1 reflected by the beam splitter 41; and an optical fiber 43 configured to guide the measurement laser beam Lm1 condensed by the condenser lens 42 to the second interferometer 6.

The first interferometer 5, which will be described later in detail, is configured to detect a beat frequency corresponding to a frequency difference between the reference laser beam Ls outputted from the reference laser 3 and the frequency monitor laser beam Lm2.

The device body 10 includes a base 11, the slider 12 movable with respect to the base 11, a drive mechanism 13 configured to drive the slider 12, a photoelectric microscope 14 allowing for observing the object W placed on the slider 12, and the second interferometer 6 disposed on the base 11.

It should be noted that a part of components of the device body 10 is not shown in FIG. 1 to show an optical path of the measurement laser beam Lm1 (the measurement light and the reference light).

The base 11 has an upper surface 110 that is horizontally set. The slider 12, the second interferometer 6 and the like are disposed on the upper surface 110. In addition, the base 11 is provided with a bridge assembly 15 that is disposed straddling the slider 12.

The slider 12 is movable in one direction (an X direction) parallel with the upper surface 110 of the base 11. The object W is set on the slider 12. The object W is placed collinearly with a later-described measurement optical path Lp1.

The drive mechanism 13 includes, for instance, a feed screw mechanism 131 and a motor 132 and is configured to move the slider 12 in the X direction. The drive of the motor 132 is to be controlled by the controller 7.

The photoelectric microscope 14 is supported above the slider 12 by the bridge assembly 15, allowing for observing the object W placed on the slider 12. In the exemplary embodiment, an observation optical axis A of the photoelectric microscope 14 is set along a direction (a Y direction) that is parallel with the upper surface 110 of the base 11 and is perpendicular to the X direction.

The second interferometer 6, which will be described later in detail, is configured to output light detection signals Sd1 and Sd2 corresponding to the displacement of the slider 12 by using the measurement laser beam Lm1.

The controller 7 includes a computer configured to control components of the laser interference device 1. In addition, the controller 7 is configured to calculate a wavelength of the frequency monitor laser beam Lm2 on the basis of the beat frequency detected by the first interferometer 5 and calculate the displacement of the slider 12 on the basis of the light detection signals Sd1 and Sd2 outputted from the second interferometer 6.

First Interferometer

A specific configuration of the first interferometer 5 will be described.

The first interferometer 5 includes a right-angle prism 51, a beam splitter 52, and a frequency detector 53.

The right-angle prism 51 is configured to reflect and guide the reference laser beam Ls, which is outputted from the reference laser 3, to the beam splitter 52.

The beam splitter 52 is configured to combine the frequency monitor laser beam Lm2, which is outputted from the measurement laser 2 and passes through the beam splitter 41, with the reference laser beam Ls, which is outputted from the reference laser 3 and reflected by the right-angle prism 51, thereby outputting an interference light Li1.

The frequency detector 53 includes: a light detector 531 configured to receive the interference light Li1 outputted from the beam splitter 52 and output a beat signal; and a frequency counter 532 configured to measure a frequency (a beat frequency $\Delta f$) of the beat signal outputted from the light detector 531. The beat frequency $\Delta f$ measured by the frequency counter 532 is inputted to the controller 7.

Second Interferometer

A specific configuration of the second interferometer 6 will be described.

The second interferometer 6 of the exemplary embodiment, which is a polarization interferometer, includes a laser beam output unit 61, a half-wave plate 62, a polarizing beam splitter 63, a light guide 64, a measurement mirror 65, a reference mirror 66, and a light detector 67.

The laser beam output unit 61 includes: an end portion 43e of an optical fiber 43 of the light guide 4; and a collimating lens 610. The measurement laser beam Lm1 outputted from the end portion 43e of the optical fiber 43 is shaped into a parallel light beam with a desired diameter through the collimating lens 610, traveling toward the half-wave plate 62 along the X direction.

The half-wave plate 62 is configured to adjust a polarization state of the measurement laser beam Lm1 outputted from the laser beam output unit 61.

The polarizing beam splitter 63, which corresponds to a second beam splitter of the invention, is configured to transmit, within the measurement laser beam Lm1 outputted from the laser beam output unit 61 and passing through the half-wave plate 62, a P-polarized light through to be outputted as a measurement light, while reflecting an S-polarized light to be outputted as a reference light.

Further, the polarizing beam splitter 63 is configured to form a single light beam Li2 from the measurement light reflected by the measurement mirror 65 to return and the reference light reflected by the reference mirror 66 to return and output the light beam Li2 to the light detector 67.

The light guide 64, which is provided by, for instance, a plurality of optical elements, includes a measurement light guide 641 configured to guide the measurement light and a reference light guide 642 configured to guide the reference light.

The measurement light guide 641 is configured to guide the measurement light outputted from the polarizing beam splitter 63 and output the measurement light in a length measurement direction (the X direction), thereby forming the linear measurement optical path Lp1 between the measurement light guide 641 and the measurement mirror 65. Further, the measurement light guide 641 is configured to guide the measurement light, which is reflected by the measurement mirror 65 to return through the measurement optical path Lp1, to the polarizing beam splitter 63.

The reference light guide 642 is configured to guide the reference light outputted from the polarizing beam splitter 63 and output the reference light in the length measurement direction (the X direction), thereby forming a reference optical path Lp2 parallel with the measurement optical path Lp1 between the reference light guide 642 and the reference mirror 66. Further, the reference light guide 642 is configured to guide the reference light, which is reflected by the reference mirror 66 to return through the reference optical path Lp2, to the polarizing beam splitter 63.

The measurement mirror 65, which is attached to the slider 12, is movable in the X direction along with the slider 12. The measurement mirror 65, which is, for instance, a retroreflector such as a corner cube prism, is configured to perform retroreflection of the measurement light outputted from the measurement light guide 641.

The reference mirror 66 is disposed on the observation optical axis A of the photoelectric microscope 14 and attached to the bridge assembly 15. The reference mirror 66, which is, for instance, a retroreflector such as a corner cube prism, is configured to perform retroreflection of the reference light outputted from the reference light guide 642.

The light detector 67 is configured to cause the measurement light and the reference light, which are contained in the light beam Li2 entering from the polarizing beam splitter 63, to interfere with each other to be combined into an interference light and to detect the interference light and output a light detection signal. The light detection signal contains the two light detection signals Sd1 and Sd2 adjusted such that phases of the light detection signals Sd1 and Sd2 are shifted by, for instance, 90 degrees. It should be noted that a detailed description of the light detector 67 is omitted, since a known technology of a polarization interferometer is applicable thereto.

Additionally, the second interferometer 6 of the exemplary embodiment includes a vacuum chamber 681, a pipe assembly 682, a bellows assembly 683, etc. as a typical laser interference device (for instance, see JP 3400393 B) and an optical path is maintained as a vacuum.

Controller

Figure 2:
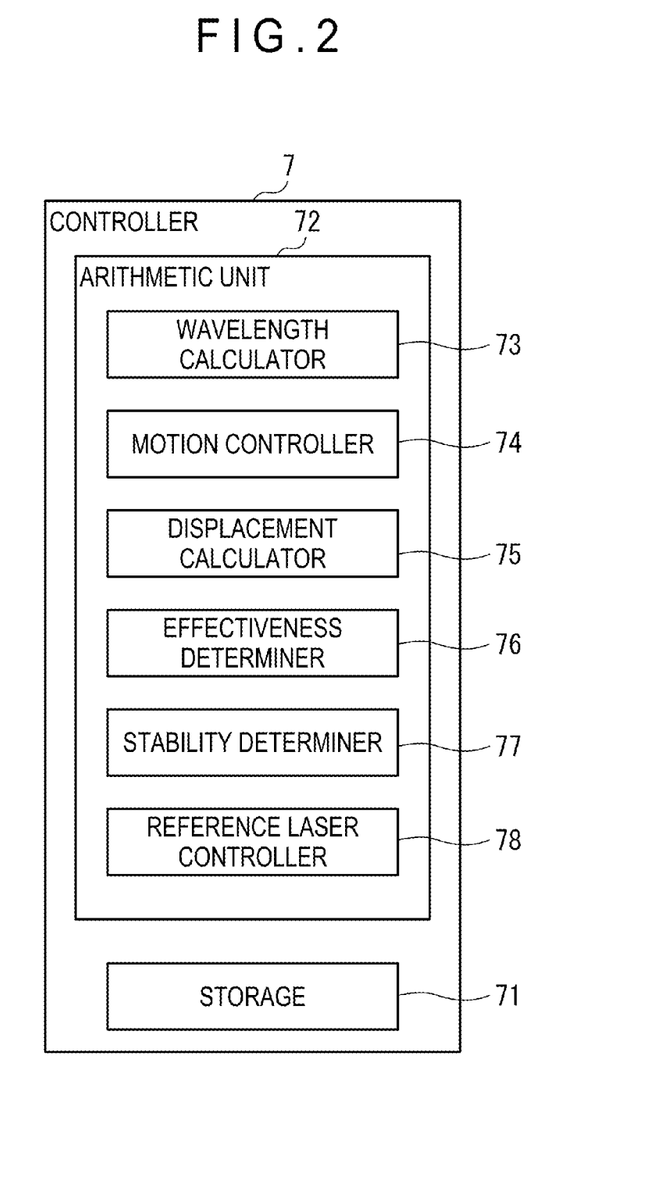
FIG. 2 is a block diagram showing a controller of a laser interference device according to an exemplary embodiment of the invention.

As shown in FIG. 2, the controller 7 includes a storage 71 in a form of a memory or the like and an arithmetic unit 72 in a form of a CPU (Central Processing Unit) or the like. The arithmetic unit 72 is configured to read and execute a software program stored in the storage 71, thereby functioning as a wavelength calculator 73, a motion controller 74, a displacement calculator 75, an effectiveness determiner 76, a stability determiner 77, and a reference laser controller 78.

The wavelength calculator 73 is configured to calculate a wavelength measurement value $\lambda m$, that is, a measurement value of the wavelength of the frequency monitor laser beam Lm2, on the basis of the beat frequency $\Delta f$ inputted from the frequency detector 53.

The motion controller 74 is configured to control a motion of the slider 12 by controlling the drive mechanism 13.

The displacement calculator 75 is configured to calculate, when the slider 12 is moved, the displacement of the slider 12 on the basis of the wavelength measurement value $\lambda m$ and the light detection signals Sd1 and S2.

The effectiveness determiner 76 is configured to determine whether or not an absolute value of a difference between the wavelength measurement value λm calculated by the wavelength calculator 73 and a reference value λref, that is, a latest wavelength measurement value λm stored in the storage 71, is equal to or less than a threshold λt1 (a first threshold of the invention), thereby determining whether or not the wavelength measurement value λm is effective.

The stability determiner 77 is configured to determine whether or not an absolute value of a difference between two wavelength measurement values λm measured before and after a displacement measurement process is equal to or less than a threshold λt2 (a second threshold of the invention), thereby determining whether or not a wavelength of the measurement laser beam Lm1 is stable.

The reference laser controller 78 is configured to control the reference laser 3, thereby adjusting an oscillation frequency of the reference laser 3 to a desired control frequency fi to stabilize the wavelength of the reference laser beam Ls. Here, the control frequency fi of the reference laser 3 is stored in the storage 71.

Measurement Process

Description will be made on a measurement process (a wavelength measurement process and the displacement measurement process) to be performed by the controller 7 of the exemplary embodiment with reference to a flowchart of FIG. 3.

Figure 3:
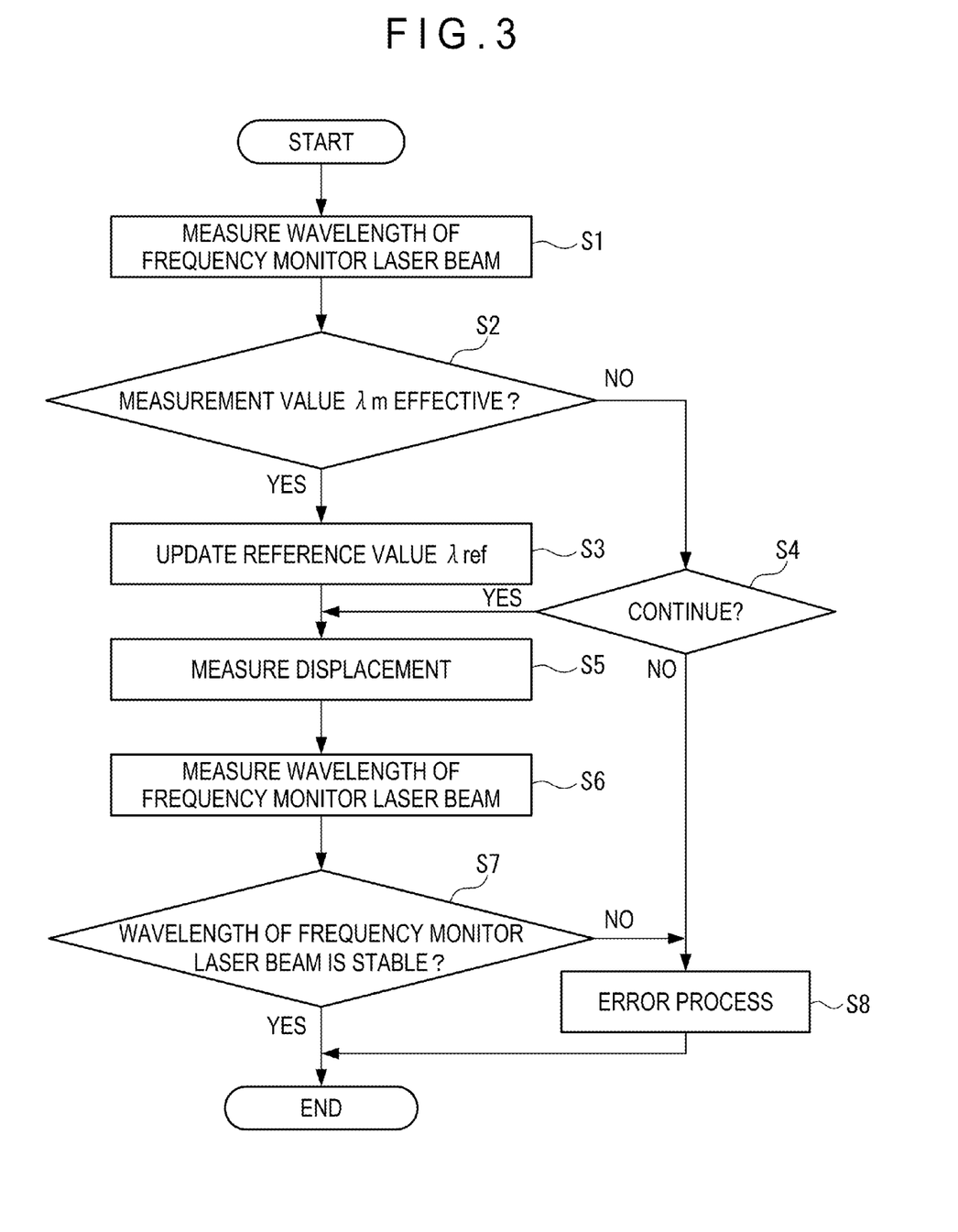
FIG. 3 is a flowchart for explaining an operation of the controller of the laser interference device of the above exemplary embodiment.

The flowchart of FIG. 3 starts when the controller 7 receives input of measurement start instructions regarding the displacement of the slider 12.

First, the wavelength calculator 73 performs the wavelength measurement process in response to the input of the measurement start instructions (step S1). Specifically, the wavelength calculator 73 acquires the beat frequency Δf from the frequency detector 53 in response to the input of the measurement start instructions and calculates, on the basis of the acquired beat frequency Δf, the wavelength measurement value λm, that is, the measurement value of the wavelength of the frequency monitor laser beam Lm2, using the following expression (1).

$$\lambda m = c/(fi + \Delta f) \qquad \text{Expression (1)}$$

In the expression (1), fi denotes the control frequency of the reference laser 3 and c denotes a speed of light. Δf denotes the beat frequency, which is subjected to sign determination, as required.

In addition, prior to step S1, the frequency counter 532 may be reset, as required.

The effectiveness determiner 76 determines whether or not the wavelength measurement value λm calculated in step S1 is effective. Specifically, the effectiveness determiner 76 determines whether or not an expression (2) is satisfied, that is, whether or not an absolute value of a difference between the wavelength measurement value λm and the reference value λref is equal to or less than the threshold λt1 (step S2). It should be noted that the reference value λref is the latest wavelength measurement value λm stored in the storage 71.

$$|\lambda m - \lambda \text{ref}| \leq \lambda t1 \qquad \text{Expression (2)}$$

In this regard, in the reference laser 3, the absorption line, which is a control reference, would unintentionally change due to an environmental factor such as temperature or vibration, causing an actual oscillation frequency of the reference laser 3 to be deviated from the control frequency fi. This causes the wavelength of the reference laser beam Ls outputted from the reference laser 3 to shift. In a case where wavelength shift occurs in the reference laser beam Ls, the wavelength measurement value λm significantly differs from an actual wavelength of the frequency monitor laser beam Lm2.

In the exemplary embodiment, for instance, an amount of a change in the wavelength of the measurement laser 2 with time is set for reference as the threshold λt1 in the expression (2). If the expression (2) is not satisfied, it can be determined that the wavelength measurement value λm fails to be normally measured due to the wavelength shift of the reference laser beam Ls, or the like, in other words, that the wavelength measurement value λm is not effective.

If it is determined that the expression (2) is satisfied in step S2 (step S2; Yes), the wavelength measurement value λm calculated by the wavelength calculator 73 is stored as an effective value in the storage 71. Thus, the wavelength measurement value λm calculated in step S1 becomes a new reference value λref in the storage 71, that is, the reference value λref is updated (step S3).

In contrast, if it is determined that the expression (2) is not satisfied in step S2 (step S2; No), the effectiveness determiner 76 informs a user of the wavelength measurement value λm with an alert and receives instructions regarding whether to continue measurement from the user (step S4). Checking the wavelength measurement value λm, the user can determine whether a cause for the alert is the wavelength shift of the reference laser beam Ls or occurrence of any other abnormality to determine whether to continue the measurement.

If the instructions from the user are continuation of the measurement (step S4; Yes), the process proceeds to step S5. In this case, the wavelength measurement value λm is not stored in the storage 71. If the instructions from the user are termination of the measurement (step S4; No), the measurement flow is terminated after performing an error process (step S8).

After step S3 or after determination of Yes is made in step S4, the motion controller 74 and the displacement calculator 75 collaboratively perform the displacement measurement process (step S5). Specifically, the motion controller 74 controls the drive mechanism 13 to move the slider 12 while the displacement calculator 75 calculates the displacement of the slider 12.

In step S5, the displacement calculator 75 performs an arithmetic process by using the reference value λref corresponding to the wavelength of the measurement laser 2 and the light detection signals Sd1 and Sd2 inputted from the light detector 67, calculating the displacement of the slider 12. A specific calculation method of the displacement calculator 75 is not limited but is exemplarily shown as follows.

During the motion of the slider 12, the light detection signals Sd1 and Sd2 periodically change in accordance with a change in an optical path length difference D between the optical path length of the measurement light and the optical path length of the reference light. The normalized light detection signals Sd1 and Sd2 are represented by the following expressions (3) and (4), respectively.

$$Sd1 = \sin\theta \qquad \text{Expression (3)}$$

$$Sd2 = \cos\theta \qquad \text{Expression (4)}$$

The expression (3) and the expression (4) are represented by an expression (5).

$$\tan\theta = \frac{\sin\theta}{\cos\theta} = \frac{Sd1}{Sd2} \qquad \text{Expression (5)}$$

θ is thus represented by an expression (6).

$$\theta = \tan^{-1}\left(\frac{Sd1}{Sd2}\right)$$  Expression (6)

Further, a one-cycle change in the optical path length difference D causes θ to change by 2π. Accordingly, assuming that N denotes the number of cycles, the optical path length difference D is represented by the following expression (7).

$$D = N \cdot \lambda ref + \theta/2\pi \cdot \lambda ref$$  Expression (7)

Then, assuming that D0 denotes an optical path length difference defined at an initial position of the slider 12 and Dn denotes an optical path length difference defined at a position of the slider 12 after the motion, the displacement of the slider 12 is represented by the following expression (8).

$$\text{Displacement} = (Dn - D0)/2$$  Expression (8)

Thus, the displacement calculator 75 can sequentially calculate the displacement of the slider 12 by performing the arithmetic process according to the above expressions (6) to (8) by using the reference value λref and the light detection signals Sd1 and Sd2.

After step S5, as in step S1, the wavelength calculator 73 calculates the wavelength measurement value λm, that is, the measurement value of the wavelength of the frequency monitor laser beam Lm2 (step S6).

Subsequently, the stability determiner 77 determines whether or not the wavelength of the measurement laser beam Lm1 has been kept stable during the displacement measurement process. Specifically, the stability determiner 77 determines whether or not an expression (9) is satisfied, that is, whether or not an absolute value of a difference between the wavelength measurement value λm calculated in step S6 and the reference value λref stored in the storage 71 (a difference between the two wavelength measurement values λm measured before and after the displacement measurement process) is equal to or less than threshold λt2 (step S7).

$$|\lambda m - \lambda ref| \leq \lambda t2$$  Expression (9)

It should be noted that the threshold λt2 is a value set on the basis of a guaranteed measurement accuracy of the laser interference device 1 and can be set with reference to, for instance, a tolerable error of the wavelength of the measurement laser 2.

In step S7, if it is determined that the expression (9) is satisfied (step S7; Yes), the controller 7 outputs, as a reliable measurement result, the wavelength measurement value λm calculated in step S6 to the storage 71, a display, or the like and terminates the measurement flow.

In contrast, if it is determined that the expression (9) is not satisfied in step S7 (step S2; No), the controller 7 terminates the measurement flow after performing the error process (step S8).

Periodic Wavelength Measurement Process

The controller 7 performs a periodic wavelength measurement process in addition to performing the wavelength measurement process during the measurement process described above. Description will be made on the periodic wavelength measurement process with reference to a flowchart of FIG. 4.

Figure 4:
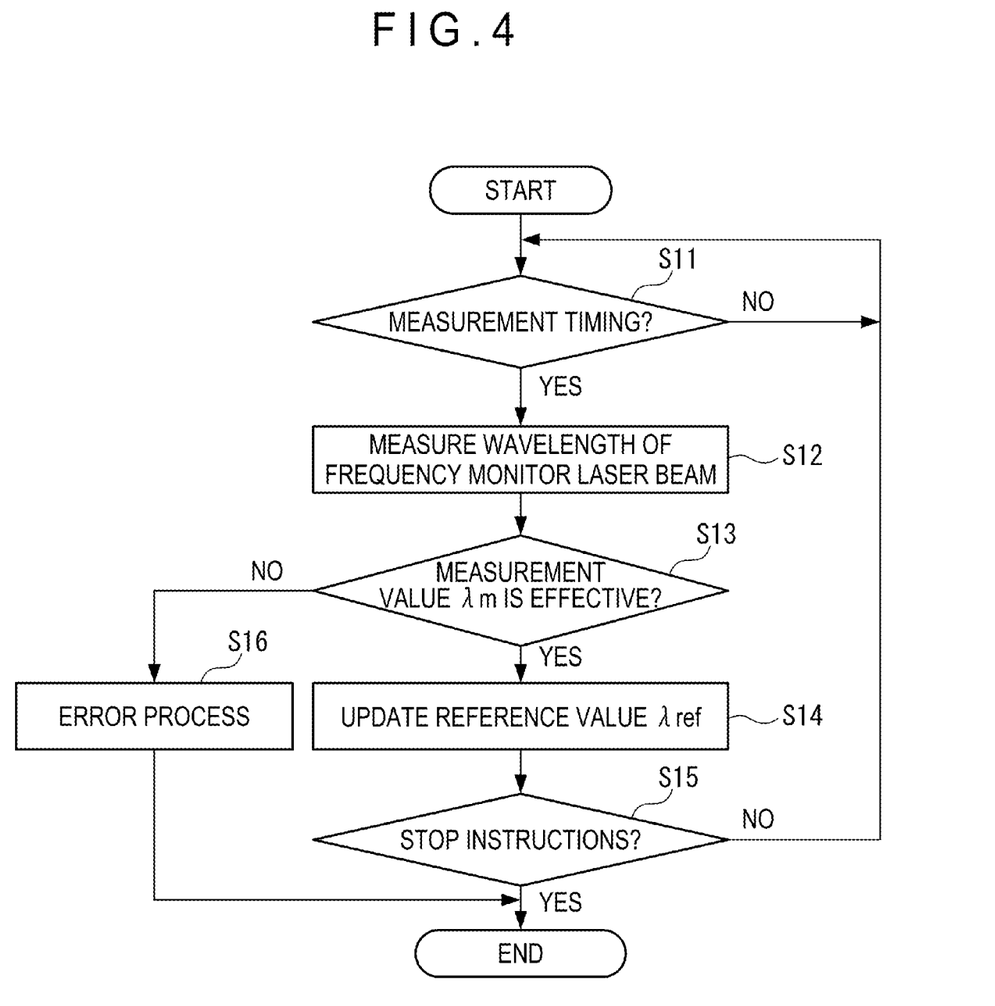
FIG. 4 is a flowchart for explaining a periodic wavelength measurement process of the laser interference device of the above exemplary embodiment.

First, the wavelength calculator 73 determines whether or not a current time is a measurement start timing (step S11). The measurement start timing is set every predetermined period in advance.

If the current time is the measurement start timing (step S11; Yes), the wavelength calculator 73 calculates the wavelength measurement value λm, that is, the measurement value of the wavelength of the frequency monitor laser beam Lm2, (step S12) and the effectiveness determiner 76 determines whether or not the wavelength measurement value λm calculated in step S11 is effective (step S13).

If it is determined that the wavelength measurement value λm is effective in step S13 (step S13; Yes), the wavelength calculator 73 stores the wavelength measurement value λm in the storage 71. Thus, the wavelength measurement value λm calculated in step S11 becomes a new reference value λref, that is, the reference value λref is updated (step S14).

Here, steps S12 to S14, which are similar to steps S1 to S3 described above, are not described in detail.

After step S14, the wavelength calculator 73 determines whether to have received stop instructions (step S15). If the determination result is No, the process returns to step S11. If the determination result is Yes, the wavelength calculator 73 terminates the periodic wavelength measurement process.

If it is determined that the wavelength measurement value λm is not effective in step S13 (step S13; No), it can be determined that the wavelength measurement value λm fails to be normally measured due to the wavelength shift of the reference laser 3, or the like. Accordingly, the wavelength calculator 73 terminates the periodic wavelength measurement process after performing the error process including notification to a manager (step S16).

Effects

In the laser interference device 1 of the exemplary embodiment described above, the laser beam Lm outputted from the measurement laser 2 is divided into the measurement laser beam Lm1 and the frequency monitor laser beam Lm2 and the measurement value of the wavelength of the frequency monitor laser beam Lm2 (the wavelength measurement value λm) is used as a calibration value of the wavelength of the measurement laser beam Lm1. This makes the measurement of the displacement of the slider 12 by using the measurement laser beam Lm1 free from an influence of a measurement error resulting from a change in the laser beam Lm with time. The laser interference device 1 of the exemplary embodiment thus does not require a typical complicated calibration work, allowing for reducing a workload of a measurer.

In particular, in the exemplary embodiment, a practical wavelength stabilized laser is used as the measurement laser 2 and a gas absorption line stabilized laser is used as the reference laser 3. In this regard, the measurement laser 2 has a feature that the wavelength is likely to gently change in a long term but wavelength shift is unlikely to occur in a short term, whereas the reference laser 3 has a feature that it is stable in a long term but wavelength shift is likely to occur due to an environmental factor in a short term. Accordingly, in the exemplary embodiment, the measurement laser beam Lm1 can be highly stabilized for a long period of time by using the advantages of both the measurement laser 2 and the reference laser 3, which can contribute to an improvement in measurement accuracy.

In addition, in the exemplary embodiment, the light guide 4 including the optical fiber 43 transmits the measurement laser beam Lm1 divided from the laser beam Lm, which allows the measurement laser 2 and the reference laser 3 to be disposed at a distance from the device body 10. This can reduce an influence of heat generated from the measurement laser 2 or the reference laser 3 on the optical path length difference of the second interferometer 6.

In the exemplary embodiment, the wavelength measurement value λm, which is used for the arithmetic process of the displacement calculator 75, is periodically updated, which allows for measuring the displacement of the slider 12 with a higher accuracy. In addition, the wavelength measurement value λm is stored in an accumulative manner, which allows for monitoring a change in the wavelength of the measurement laser 2 with time.

In the exemplary embodiment, the effectiveness determiner 76 can determine whether or not the wavelength measurement value λm is effective by determining whether or not the absolute value of the difference between the wavelength measurement value λm and the reference value λref is equal to or less than the threshold λt1. Thus, the wavelength calculator 73 can perform the arithmetic process by using the wavelength measurement value λm determined to be effective and, consequently, the displacement of the slider 12 can be measured with a higher accuracy.

In the exemplary embodiment, the wavelength calculator 73 acquires the beat frequency Δf from the frequency detector 53 in response to the input of the measurement start instructions regarding the displacement of the slider 12. Thus, the displacement calculator 75 can perform the arithmetic process by using the wavelength measurement value λm closer to a current wavelength of the frequency monitor laser beam Lm2 and, consequently, the displacement of the slider 12 can be measured with a higher accuracy.

In the exemplary embodiment, the stability determiner 77 can determine whether or not the wavelength of the measurement laser beam Lm1 is stable by determining whether or not the absolute value of the difference between the two wavelength measurement values λm measured before and after the displacement measurement process is equal to or less than the threshold λt2. This allows for confirming effectiveness regarding a measurement result of the displacement of the slider 12.

Modifications

The invention is not limited to the above exemplary embodiment and modifications and the like that are compatible with an object of the invention are within the scope of the invention.

In the above exemplary embodiment, the wavelength calculator 73 periodically calculates the wavelength measurement value λm and the calculation is performed before and after the displacement measurement process; however, the invention is not limited thereto and the wavelength measurement value λm may be calculated at any timing.

Further, in the measurement process of the above exemplary embodiment, the process of the effectiveness determiner 76 and the process of the stability determiner 77 may be omitted.

In the above exemplary embodiment, the beam splitter 41 is used as the first beam splitter of the invention; however, any other optical element may be used. It should be noted that in a case where an optical system using polarization is provided, a wavelength plate, a polarizer, or the like is added, if necessary.

The second interferometer 6 of the exemplary embodiment is a polarization interferometer but may be any other type of interferometer. In other words, the polarizing beam splitter 63 is used as the second beam splitter of the invention in the above exemplary embodiment; however, any other optical element may be used.

Further, in the above exemplary embodiment, the measurement laser beam Lm1 is transmitted through the optical fiber 43; however, the invention is not limited thereto. For instance, the measurement laser 2 may be disposed near the device body 10, causing the frequency monitor laser beam Lm2 to be transmitted through an optical fiber to the first interferometer 5.

The laser interference device 1 of the above exemplary embodiment includes the photoelectric microscope 14; however, the invention is not limited thereto and the laser interference device 1 may include a probe, a machining tool, or an exposure optical system. For instance, in a case where a line measure substrate on which a resist is applied is the object W, the laser interference device 1 may include, in place of the photoelectric microscope 14, an exposure optical system configured to form a memory pattern onto the line measure substrate by exposure.

In addition, the invention is applicable to a variety of laser interference devices configured to measure a displacement of a movable body.

What is claimed is:

1. A laser interference device comprising:
   a measurement laser configured to output a laser beam;
   a first beam splitter configured to divide the laser beam into a measurement laser beam and a frequency monitor laser beam;
   a reference laser configured to output a reference laser beam;
   a frequency detector configured to detect a beat frequency resulting from interference between the reference laser beam and the frequency monitor laser beam;
   a wavelength calculator configured to calculate a wavelength of the frequency monitor laser beam on a basis of the beat frequency inputted from the frequency detector;
   a second beam splitter configured to divide the measurement laser beam into a measurement light and a reference light;
   a light detector configured to detect an interference light of the measurement light reflected on a measurement mirror and the reference light reflected on a reference mirror and output a light detection signal;
   a displacement calculator configured to calculate a displacement of the measurement mirror by performing an arithmetic process based on a wavelength measurement value and the light detection signal, the wavelength measurement value indicating the wavelength calculated by the wavelength calculator, and
   an effectiveness determiner configured to determine whether or not an absolute value of a difference between the wavelength measurement value and a reference value of the wavelength of the frequency monitor laser beam stored in a storage is equal to or less than a first threshold set in advance.

2. The laser interference device according to claim 1, wherein
   the wavelength calculator is configured to periodically calculate the wavelength measurement value by periodically acquiring the beat frequency.

3. The laser interference device according to claim 1, A laser interference device comprising:
   a measurement laser configured to output a laser beam;
   a first beam splitter configured to divide the laser beam into a measurement laser beam and a frequency monitor laser beam;
   a reference laser configured to output a reference laser beam;

a frequency detector configured to detect a beat frequency resulting from interference between the reference laser beam and the frequency monitor laser beam;

a wavelength calculator configured to calculate a wavelength of the frequency monitor laser beam on a basis of the beat frequency inputted from the frequency detector;

a second beam splitter configured to divide the measurement laser beam into a measurement light and a reference light a light detector configured to detect an interference light of the measurement light reflected on a measurement mirror and the reference light reflected on a reference mirror and output a light detection signal; and a displacement calculator configured to calculate a displacement of the measurement mirror by performing an arithmetic process based on a wavelength measurement value and the light detection signal, the wavelength measurement value indicating the wavelength calculated by the wavelength calculator; and a stability determiner, wherein:

the wavelength calculator is configured to acquire the beat frequency from the frequency detector in response to input of measurement start instructions regarding the displacement of the measurement mirror, the wavelength calculator is configured to further acquire the beat frequency from the frequency detector in response to termination of the arithmetic process performed by the displacement calculator, and the stability determiner is configured to determine whether or not an absolute value of a difference between the wavelength measurement value calculated in response to the input of the measurement start instructions and the wavelength measurement value calculated in response to the termination of the arithmetic process is equal to or less than a second threshold set in advance.

4. The laser interference device according to claim 3, wherein the wavelength calculator is configured to periodically calculate the wavelength measurement value by periodically acquiring the beat frequency.

* * * * *

UNITED STATES PATENT AND TRADEMARK OFFICE
CERTIFICATE OF CORRECTION

PATENT NO. : 11,353,315 B2
APPLICATION NO. : 17/197349
DATED : June 7, 2022
INVENTOR(S) : Yokoyama It is certified that error appears in the above-identified patent and that said Letters Patent is hereby corrected as shown below:

In the Claims
At Column 12, Line 60 (Claim 3), please change "The laser interference device according to claim 1, A" to -- A --.
At Column 13, Line 10 (Claim 3), please change "light" to -- light; --.

Signed and Sealed this
Eleventh Day of October, 2022

Katherine Kelly Vidal
*Director of the United States Patent and Trademark Office*